July 28, 1959     E. A. ROCKWELL     2,896,733

POWER STEERING SYSTEM

Filed July 2, 1954     4 Sheets-Sheet 1

INVENTOR
EDWARD A. ROCKWELL
BY Arthur Wright
ATTORNEY

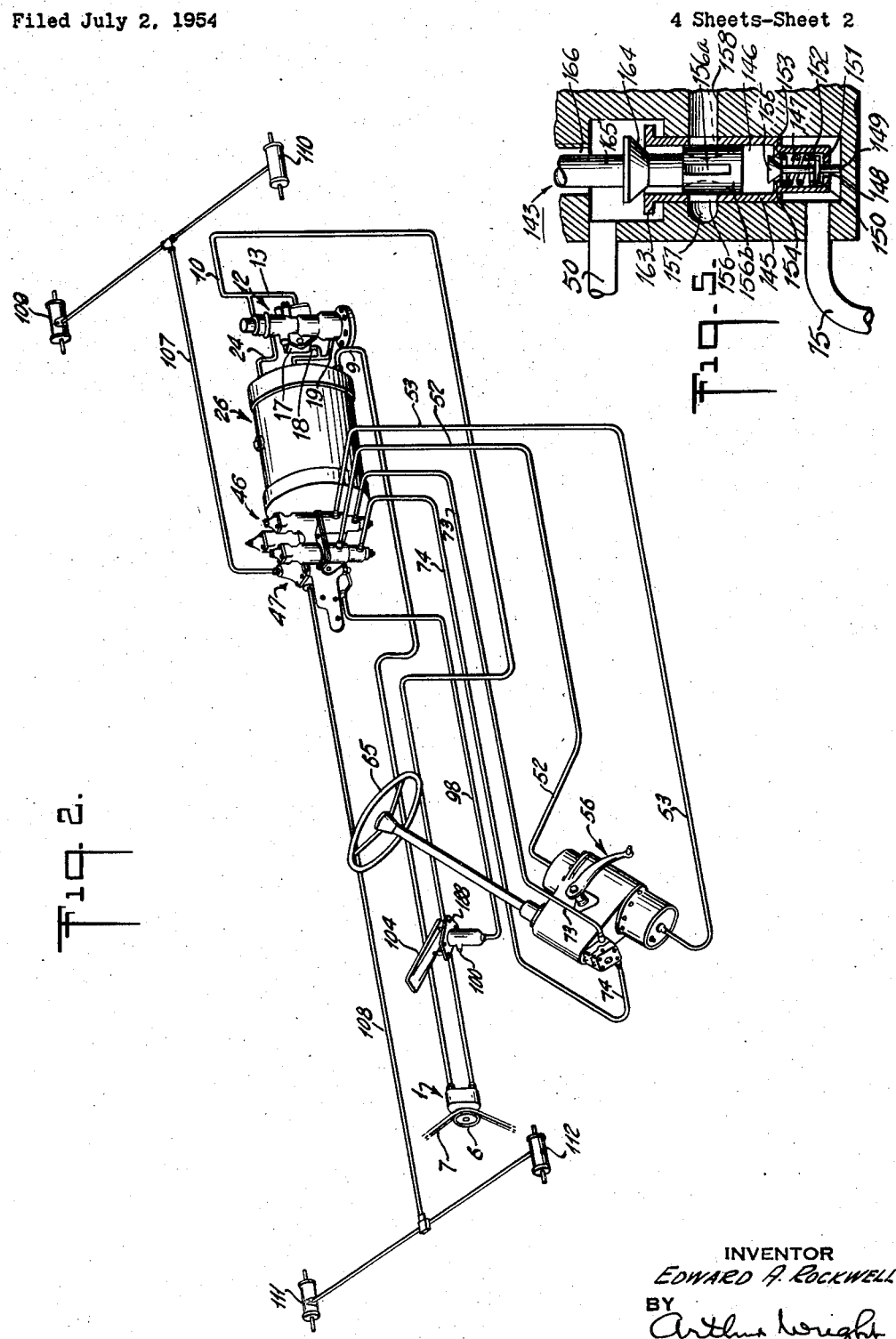

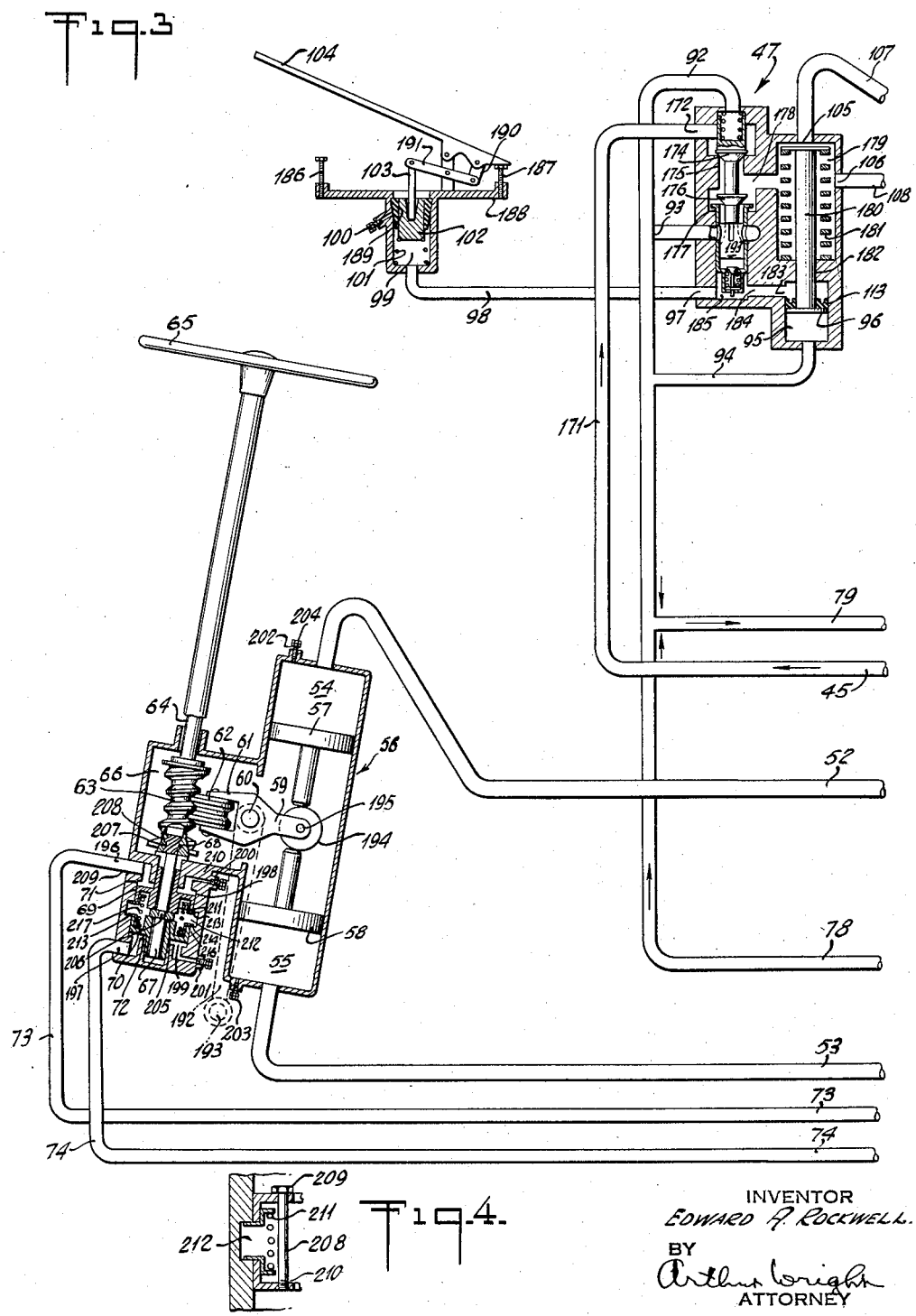

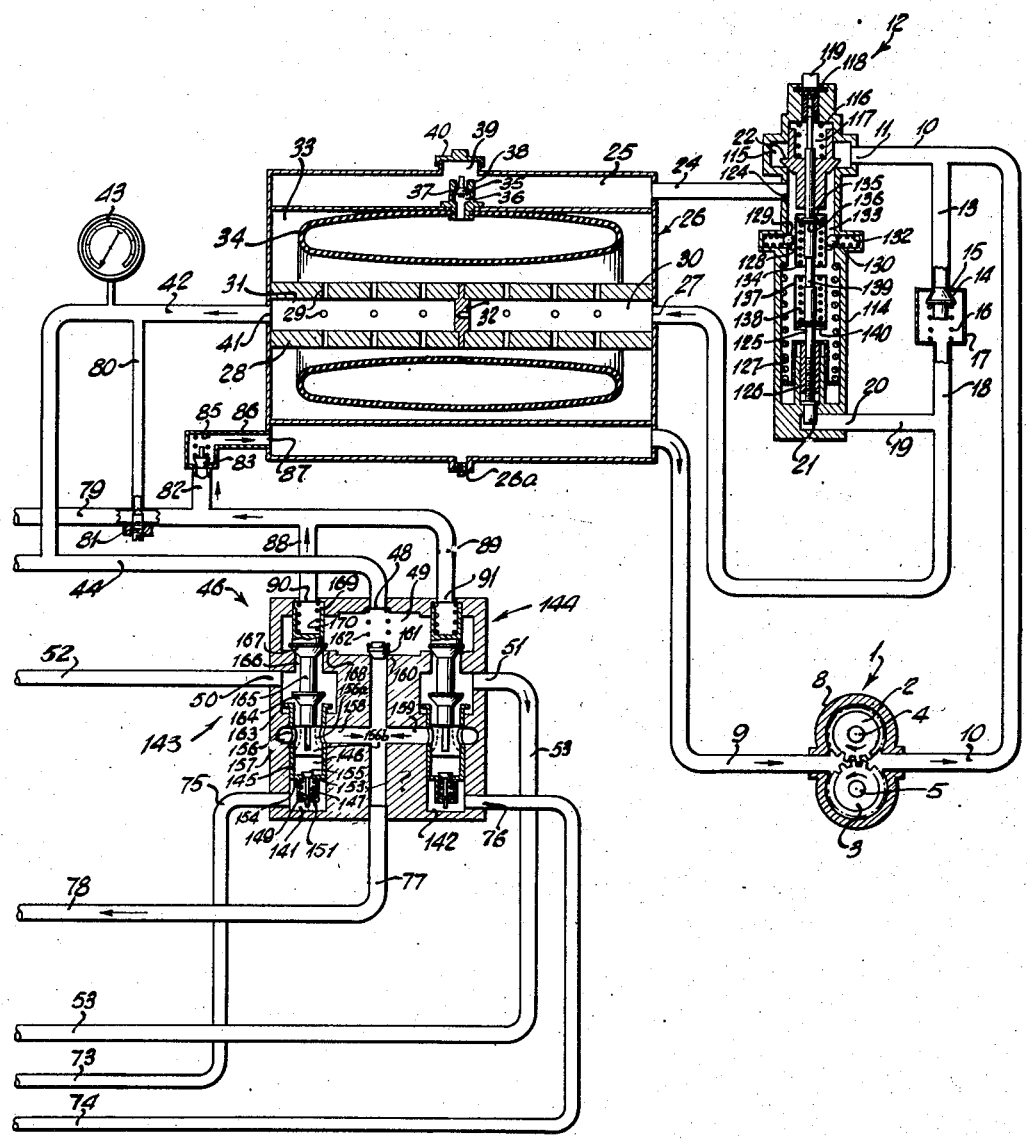

United States Patent Office 2,896,733
Patented July 28, 1959

2,896,733
POWER STEERING SYSTEM

Edward A. Rockwell, Los Angeles, Calif.

Application July 2, 1954, Serial No. 440,993

17 Claims. (Cl. 180—79.2)

My invention relates to hydraulic control systems and more particularly to a power steering and power brake control system for automotive vehicles.

It is a general object of the invention to provide a hydraulic control system which incorporates both low and high pressure sections, and wherein the low pressure section is maintained filled with fluid derived from the high pressure section. It is another general object of the invention to provide a hydraulic control system for automotive vehicles in which independent fluid motors supplying the power for brake and steering actuation are operated from a common pressure fluid source.

Another general object is to provide a hydraulic control system having a low pressure section wherein the fluid in the lines is non-circulating and maintained at relatively low pressures. A related, more specific object of the invention is to provide a combined power steering and brake control system employing manually operated master cylinders for both steering and braking. A further related and more specific object is to provide a system in which manually developed pressures in the low pressure section actuates the valves for controlling the supply of pressure fluid from a pressure fluid source to fluid motors for brake and steering actuation. A further related object is to provide compensating means in association with the brake and steering valves for admitting fluid from the pressure fluid source to the low pressure sections including the master cylinders.

A further object of the invention is to provide a control system for an automotive vehicle having a manually operated hydraulic means for adjusting the pressure in both brake and steering cylinders. A related object is to provide such a system including dual circuits having high pressure and low pressure sections, such sections being supplied with fluid from a common source. A related object is to provide an automotive control system for both power steering and power braking, utilizing and requiring only a single source of power fluid.

A further object is to provide in such a system means for maintaining the low pressure sections of the circuits, as well as the high pressure sections, filled with fluid from the common source of pressure fluid.

A further object is to provide a system for power brake and power steering operation wherein the power available to operate one circuit is not limited during periods of operation of the other circuit so as to provide means for insuring that power is available to operate both brakes and steering when required.

A further object is to reduce the problem of leakage normally encountered with conventional master cylinders in automotive power systems, by providing a low pressure circuit in which the pressures encountered are of such a magnitude as to permit better sealing with commercially available elements. Another object is to provide a system in which the high pressure circuit may be located adjacent the element to be operated in the form of a power package, and wherein the high pressure lines may be shorter to reduce the likelihood of leakage and the cost of the manufacture.

While my invention is capable of embodiment in many different forms, for the purpose of illustration I have shown only one embodiment thereof in the accompanying drawings, in which—

Fig. 2 is a perspective view showing the said system;

Fig. 3 is a cross-section, enlarged, of a detail of the power steering unit and brake control;

Fig. 3a is a similar view of the remainder of the system;

Fig. 4 is a cross-section, enlarged, of the master piston; and

Fig. 5 is an enlarged sectional detail of a valve plunger and associated valve parts.

Figure 1:
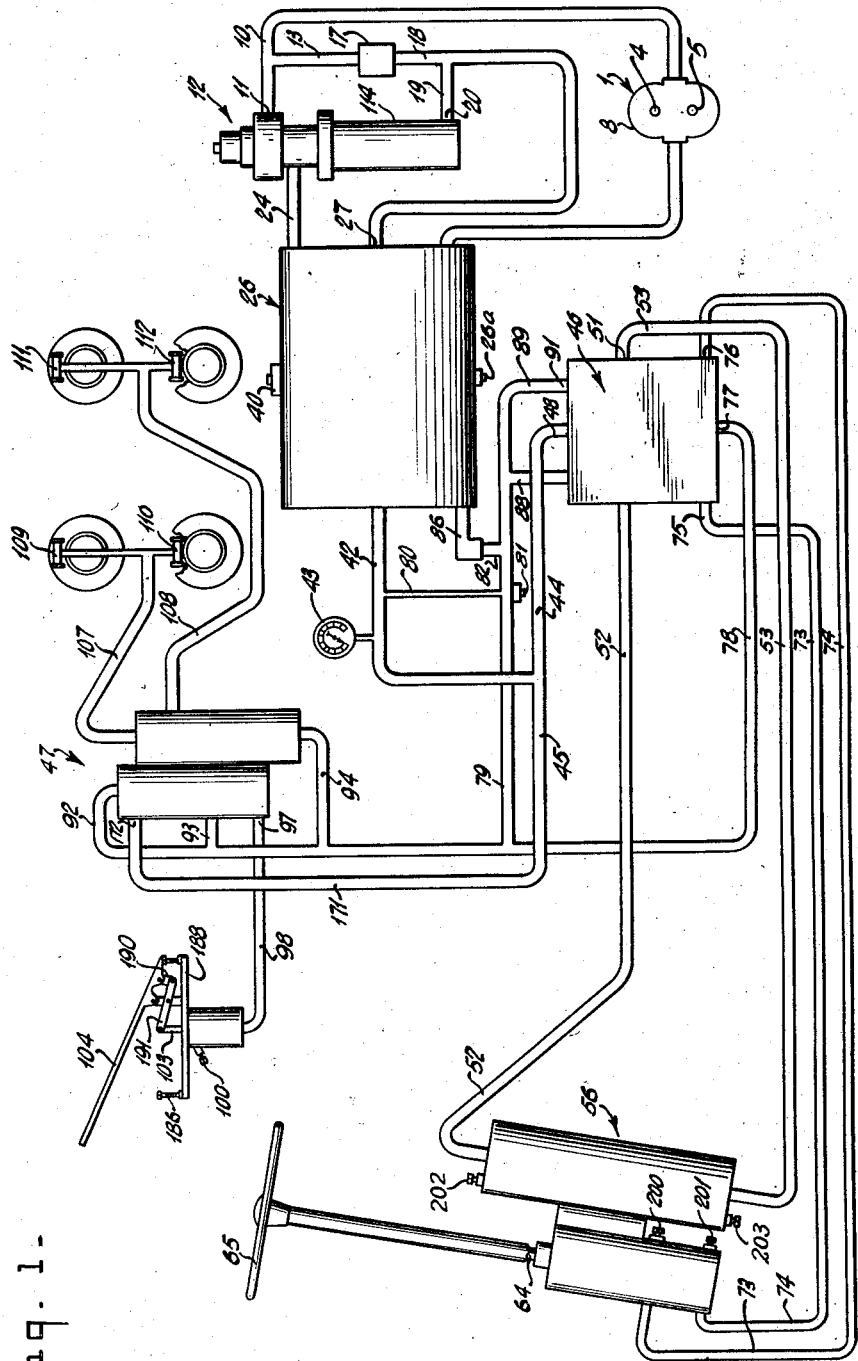
Fig. 1 is a diagrammatic representation of a power system made in accordance with my invention, for the control of the steering and brake mechanism of an automotive vehicle by means of power.

Referring to the drawings, I have shown a diagrammatic representation of the system for controlling the steering and brakes of an automotive vehicle, as for instance a truck, by means of power, and preferably by means of hydraulic pressure. For providing a source of pressure fluid for the power steering and power brake control system I have shown a gear pump 1 having two meshing gears 2 and 3 carried on shafts 4 and 5, respectively, one of which, for instance the shaft 4, may be constantly driven by a pulley 6 from a belt 7 driven from an internal combustion engine provided for driving the truck. The said gears 2 and 3 are located in a pump housing 8 mounted on the vehicle chassis, so as to receive circulating hydraulic liquid of any desired kind from an inlet pipe 9 and discharge the same from an outlet pipe 10. The said liquid, under any desired pressure, is thence delivered by the pipe 10 to an inlet 11 in an unloading valve 12 which is constructed substantially like the unloading valve made in accordance with my invention, as set forth in my Patent No. 2,372,016, upon Unloader Valve, granted March 20, 1945. Connected to the outlet pipe 10 there is, also, a branch pipe 13 having therein a check valve 14 normally pressed into seating position against a valve seat 15 by a helical spring 16, in a chamber 17 which is connected to a main supply or delivery pipe 18. This pipe 18, furthermore, has a branch pipe 19 which leads to an inlet 20 in the lower end of the unloading valve 12 so that when the pressure in the pipe 18 exceeds a certain amount it will operate on the end of a plunger 21 to move the same and thereby quickly open a by-pass valve 22 normally seated on a valve seat 23, in accordance with the further description, hereinafter, of the operation of the by-pass 22, and in accordance with the operation of the unloading valve shown and described in my Patent No. 2,372,016 aforesaid. When this occurs the hydraulic pressure liquid from the pipe 10 is released through a discharge pipe 24 from the unloading valve 12 to be returned to an outer annular heat equalizing chamber 25 in a pressure accumulator 26 having a normally closed draw-off port 26a for moisture, etc., the said accumulator being described further hereinafter, and thence by the return pipe 9 to the inlet side of the gear pump 1.

The main supply of liquid under pressure is, thus, conveyed at a pressure not exceeding a desired maximum owing to the unloading valve 12, to an inlet port 27 on the accumulator 26 and thence into a cylinder 28 having a number of peripheral apertures 29, and which is divided between its ends into an inlet chamber 30 and an outlet chamber 31 by means of a partition 32. The liquid, thus, has access through the apertures 29 in the walls of the cylindrical chamber 28 to an inner annular chamber 33 containing an inflated annulus of rubber or rubber substitute 34, and which may be inflated to any particular desired pressure, suitable for acting as a compressible accumulator, through an air inlet valve 35 normally seated by a helical spring 36 on a valve seat 37 in a screw-threaded nipple 38, access through which is made available by means of an opening 39 having a screw cap 40 in the outer wall of the pressure accumulator 26. In this way the pressure of the hydraulic liquid is maintained in the outlet chamber 31 by means of the compressible inflated annulus 34 so as to be delivered therefrom through an outlet port 41 and thence to a supply pipe 42 having a pressure indicator 43 thereon.

The means above described delivering fluid to the supply pipe 42 thus provides a source of high pressure fluid.

In accordance with one of the main aspects of the invention, the pipe 42 through its branches 45, leads such fluid to dual hydraulic circuits including valve-operating mechanism 46 for controlling the power steering, and valve mechanism 47 for operating the brakes by means of power.

For power steering the vehicle wheels, in the present instance I employ a power steering valve mechanism 46, which, in accordance with the present invention, is included in a hydraulic control circuit having a high pressure section providing means for operating the power cylinders connected to steer the vehicle wheels and a low pressure section including a master cylinder operated by the steering wheel to vary the pressure therein. The valve mechanism 46 is located between the sections, and is responsive to the manually varied pressure in the lower pressure section to control the pressure in the high pressure section accordingly. It is comprised, in general, of an inlet 48 for the hydraulic fluid under pressure received from the accumulator 26, which enters a chamber 49 therein, so as to be released, as desired, from the said chamber 49 into the high pressure section by an outlet port 50 or an outlet port 51 to pipes 52 and 53 of the high pressure section and leading, respectively, to a power cylinder 54 or a power cylinder 55 of a steering unit 56, which will be described, further, hereinafter. The hydraulic fluid in the high pressure section is thus admitted to one or the other of the cylinders 54 and 55 and will move one or the other of the pistons 57 and 58 so as to apply power for the rotation of a lever 59 on a fixed pivot 60, having a yoke 61 carrying between its arms a worm gear 62 which is guided in a worm wheel 63 rotatable on a steering column 64 longitudinally movable in the worm 63, provided with a steering wheel 65 thereon, the lower end of which extends into a housing 66 connected to the cylinders 54 and 55 and in which the fixed pivot 60 is located.

The master cylinder included in the low pressure section of the control circuit for power steering is mounted in association with the steering column 64 which has an end of reduced diameter, forming a master cylinder operating rod 67, the rod 67 being arranged to reciprocate with the steering column 64 due to a worm connection 68 formed on the outside of the steering column 64 with which it is connected by an internal worm 68a formed in the worm 63. In this way, by the rotation of the steering wheel 65 an upper master cylinder piston 69 and a lower master cylinder piston 70, fastened to the rod 67, may be raised or lowered between a master cylinder 71 and a master cylinder 72, said cylinders being connected, respectively, by pipes 73 and 74 of the low pressure section to inlets 75 and 76 on the steering valve mechanism for the operation of the valves therein alternately and so as to supply power either to the cylinder 54 or the cylinder 55, as desired, in order to aid in the operation of the steering control mechanism, as referred to hereinafter. An outlet opening 77 leads from the steering valve mechanism 46 to a pipe 78 which is connected to a return pipe 79 having an emergency branch connection 80 normally closed by a screw plug 81 to the main hydraulic liquid supply pipe 42. This return pipe 79 is connected by a branch pipe 82 to a check valve 83 having a valve seat 84 on which it is normally pressed into seated position by a helical spring 85. This valve 83, 84 gives access, by means of a pipe 86, to an inlet 87 into the outer return annular chamber 25 located in the pressure accumulator 26. Also, the said branch pipe 79 has a branch connection 88 and another branch connection 89 which lead to outlets 90 and 91, respectively, to carry off any leakage from the valves in the steering control mechanism 46.

Similarly, the return pipe 78 has a connection 92 leading to the upper portion of the brake valve 47 so as to carry off any leakage therefrom, another branch pipe 93 to carry off discharged liquid from the brake valve 47, and still another branch pipe 94 to carry off any leakage from a travel coordination cylinder 95, carrying a travel coordinating plunger 96 which is moved in the operation of the brake valve mechanism 47, as referred to hereinafter.

In keeping with the invention, the hydraulic control system of this invention provides a control circuit for brake operation including a high pressure section providing fluid for operating the brake cylinders and a low pressure section including a master cylinder operated by the treadle. Included in the system between the sections is the brake valve mechanism 47. For the purpose of operating the brake valve mechanism 47, there is a manual pressure inlet 97 which is connected by a pipe 98 of the low pressure section leading to a manual pressure cylinder or master cylinder 99 having an air bleeder valve 100 of any desired kind therein, and a reaction spring 101 which normally forces upwardly a plunger 102, as referred to further hereinafter, but which has, in general, a plunger rod 103 for operating the same, operated by a treadle 104. It will be understood that as the treadle 104 is depressed, hydraulic power liquid from the brake valve mechanism 47 will be delivered by outlets 105 and 106 to brake lines 107 and 108, of the high pressure section, respectively, which, respectively, lead to front wheel brake operating cylinders 109 and 110 and rear wheel brake operating cylinders 111 and 112. The pressure exerted on the wheel brakes by means of said cylinders 109, 110, 111 and 112 is, also, coordinated with the movement of the treadle 104 by reason of the fact that the travel coordinating piston 96, which has a seal 113, is moved according to the pressure delivered to the pipes 107 and 108, so as to increase coordinately the volume provided for the manually moved liquid in the pipe 98.

The unloading valve 12 may be constructed as set forth in detail in my Patent No. 2,372,016, as aforesaid, but, as shown in the drawings herein, the said unloading valve 12 may comprise a casing 114 into which the pipe 10 leads by means of the inlet port 11, which communicates with a valve chamber 115 in which the conical valve 22 is contained so as normally to be seated on the valve seat 23 due to the force of a helical spring 116, the lower end of which is received in a cylindrical recess 117 in the upper portion of said valve 22, said spring 116 seating at its upper end against the interior of the casing 114. This end of the spring 116 is, also, located around a guiding stem 118 on a removable plug 119. The said valve 22, 23 permits the high pressure liquid from the pipe 10 to be released through an outlet opening 124 to the pipe 24 and thence to the return chamber 25 in the accumulator 26. The opening of this valve 22, 23 occurs when the pressure in the pipe 10 becomes greater than the desired maximum and the opening of said valve is accomplished by a snap mechanism, which is shown in detail in the said Patent No. 2,372,016. However, this comprises the plunger 21 hereinabove referred to, communicating with the pipe 19, and which is adapted to move a rod 125, and an adjustable sleeve 126 screw-threaded thereon, against the force of a helical spring 127 in the casing 114. When the rod 125 is moved in this manner it will accumulate an increasing spring pressure against a tapered flange 128 on the other side of a pair of spherical balls 129 and 130 which are held inwardly, normally, by springs 131 and 132 carried in recesses in the casing 114. The tapered flange 128, for this purpose, is carried on a spring shell 133 supporting within the same a helical spring 134, the other end of the spring being held in position by a flanged sleeve 135 resting against a split ring 136 fastened to the rod 125. The spring shell 133, also, rests against another spring shell 137 movable on the rod 125 and retaining therein a helical spring 138 around a flange spring retainer 139 held in fixed position on the rod 125 by a split ring 140. This spring 138 yieldingly resists movement of the tapered projection 128 upwardly from the position shown in Fig. 3a and the spring 134 yieldingly resists the movement of the tapered flange 128 downwardly from above the position of the balls 129 and 130.

The accumulator 26 is, in construction, the same as described in detail in my copending application upon Accumulator Apparatus and System, executed August 26, 1946, Ser. No. 440,894, filed July 2, 1954, and this being the case it is not deemed necessary to describe the same in detail, here, as other accumulators may be used instead, if desired.

The steering control valve mechanism 46 is described specifically in detail in my copending application upon Steering Valve Mechanism, executed May 10, 1946, Ser. No. 440,997, filed July 2, 1954. However, as will be seen from the drawings, this mechanism comprises, as above indicated, the inlet ports 75 and 76 for manually supplied hydraulic liquids, which may be supplied, alternately, for instance, from any desired master cylinder for the control of the steering valve mechanism 46. These inlets 75 and 76 communicate, respectively, with slave cylinders or valve chambers 141 and 142 so as to operate valve mechanisms 143 and 144 therein, which are constructed the same as each other and only one of which will be described in detail, accordingly. The valve mechanism 143 comprises an outlet valve plunger 145 having a central bore 146 leading to a small valve chamber 147, the lower portion thereof having an inlet opening 148 to receive a valve stem 149 having a spider 150 secured thereto to cooperate with a flange 151 at the lower portion of the outlet valve plunger 145. This spider 150 cooperates with a helical valve-seating spring 152, the upper end of which rests against an internal flange 153 in said plunger 145 so as to provide a valve seat 154 for a conical liquid compensation valve 155 which is arranged to be unseated by the valve rod 149 contacting with the valve casing, in the lowermost position of the valve plunger 145. Said valve plunger 145, furthermore, has peripheral openings 156 to communicate with flutings 156a on a valve plunger 156b, an annular chamber 157 in the valve casing and thence with a passageway 158, passing across the interior of the valve casing of the valve mechanism 46 to the other similarly constructed valve 144 and leading to a passageway 159. The upper end of the vertical passageway 159 leads to the high pressure chamber 49 where it has a valve seat 160 normally closed by a liquid compensating conical check valve 161 pressed against its seat by a helical spring 162 seated on the valve casing beneath the high pressure inlet port 48. Said vertical passageway 159, furthermore, leads to the discharge port 77. The upper end of the valve plunger 145, also, has a valve seat flange 163 to cooperate with a conical outlet valve 164 on a valve stem 165 on the plunger 156b, around which some leakage takes place for compensation through the valve 155. The valve stem 165 passes upwardly through a passageway 166 and has at its upper portion a conical inlet valve 167 cooperating with a valve seat 168 and provided on its upper portion with a spring-retaining cylinder 169 having therein a helical inlet valve-seating spring 170 seated against the interior of the valve casing, and in communication with the discharge pipe 88. This discharge pipe 88, as above referred to, communicates with the discharge pipe 79 which, likewise, leads to the discharge pipe 92 from the brake control valve 47. Also, it will be noted that the high pressure pipe 44 which communicates with the inlet 48 in the steering control valve mechanism 46, is also connected by a pipe 171 to a high pressure inlet port 172 on the brake control valve mechanism 47.

Further in keeping with this invention, the brake control valve mechanism 47 includes a compensating valve means 173 which operates to admit fluid at residual pressure, from the line 79 via the line 92 to the low pressure section including the pipe 98 and the brake master cylinder 99. The compensating valve device 173 in the present instance is constructed the same as the valve mechanisms 143 and 144 just described, and which, accordingly, will not be described in detail. Moreover, it is to be understood that this compensating valve device 173, as well as the valve devices 143 and 144, may each be constructed per se in the same manner as set forth in detail in my Patent No. 2,244,966, granted June 10, 1941. This valve mechanism 173, as shown in Fig. 3, may comprise, as in the case of the valve devices 143 and 144, an inlet valve 174, 175 and an outlet valve 176, 177. The inlet valve 174, 175 and the outlet valve 176, 177 communicate with a transverse passageway 178 which leads to a plunger chamber 179 having within the same a plunger 180, normally pressed upwardly by a strong spring 181 and so constructed as to be compressed in accordance with the degree of the hydraulic pressure delivered by the outlet port 105 to the wheel brake cylinders 109, 110, 111 and 112. Furthermore, this plunger 180 extends downwardly through a passageway 182 into a cylinder 183 having therein the piston 96 hereinabove referred to, which is provided for the purpose of coordinating the travel of the treadle 104 with the pressures which are delivered through the outlet port 105 of the wheel brake cylinders 109, 110, 111 and 112. As above state, this piston 96 has a discharge chamber 95 below the same connected by the pipe 94 to carry off any leakages of liquid to the discharge pipe 92. The cylinder 183 above the piston 96 is connected by a passageway 184 to a plunger chamber 185 for receiving hydraulic liquid under manually applied pressure from the inlet 97 by means of the pipe 98. The portion of this valve mechanism which includes the pressure responsive plunger 180 and the travel coordinating piston 96 is, also, described in detail in my copending application upon Brake Valve Mechanism, executed May 10, 1946, Ser. No. 440,995, filed July 2, 1954.

The manual pressure liquid in the pipe 98, and which is supplied by the position of the treadle 104 operating between adjustable stops 186 and 187 in a floor-board plate 188 by the movement of the plunger 102 in the plunger chamber 99 having a peripheral seal 189, is constructed so as to operate a link 190 and lever 191 leading to the plunger 102. The details of the brake treadle mechanism which may be used for this purpose may be constructed in accordance with the subject matter of my copending application upon Brake Pedal Mechanism, executed May 10, 1946, Ser. No. 440,996, filed July 2, 1954.

The power steering unit operated by the steering wheel 65 may be constructed as described in my copending application upon Power Steering Unit, executed May 10, 1946, Ser. No. 440,999, filed July 2, 1954, but, as shown in the drawings herein, this, as above referred to, may comprise the steering column 64 adapted to be rotated for steering the automobile by means of the steering wheel 65. For thus purpose, the steering column 64 passes through the worm wheel 63 which, by the operation of the gear 62 and movement of the bifurcated lever 59 on its pivot 60, rotates a steering arm 192 having a pivotal connection 193 to the steering rod extending across the automobile in the usual way and attached to the pivotal supports of the front wheel of the automobile for guiding the same (not shown). This provides mechanical means connecting the steering wheel and the wheels for manually steering the same. This movement of the steering arm 192 is, furthermore, aided by the application of power to the lever arm 59 by the pistons 57 and 58 which cooperate with a wheel 194 on a pivot 195 on the said arm 59. Thus, the fluid motor is connected to the mechanical means for power steering the wheels. The power for the movement of these pistons 57 or 58, in one or the other direction as desired, is, as previously indicated, supplied by means of the high pressure liquid delivered by the pipes 52 and 53 from the steering valve mechanism 46. The modulated amounts of this high pressure liquid to accomplish this purpose are determined by the delivery of the master cylinder liquid under the manual pressure, by means of the pipes 73 and 74 which lead, respectively, to ports 196 and 197 on the power steering unit. These ports 196 and 197 communicate, respectively, with an upper master cylinder 198 in which the piston 69 reciprocates and a lower master cylinder 199 in which the lower piston 70 reciprocates. These two chambers may have screw-threaded air bleeder valves 200 and 201, respectively, and the cylinders 54 and 55 may have similar screw-threaded air bleeder valves 202 and 203, respectively. Each of said valves has an internal removable screw 204, in the usual manner, to permit accumulated air to escape, when desired. The two pistons 69 and 70 are located around the longitudinally shiftable stem or rod 67 to which they are fastened by a bearing 205 having ball races 206 and balls 207, and said rod 67 has thereon the external worm gear 68 cooperating with the internal worm gear 68a formed in the lower end of the worm 63, which is located around the steering column 64. The pistons 69 and 70, furthermore, may be connected together by adjusting screws 208 located in sockets 209 and 210, respectively. It will be noted, furthermore, that the pistons 69 and 70, respectively, are yieldably supported with regard to a central chamber 211 extending into a peripheral recess 212. Furthermore, the two plungers 69 and 70 are pressed apart outwardly to the limits of their positions, as determined by the said screws 208 which are adjacent to two spring-retaining rings 213 and 214, the outer edges of which are limited in their inward movement by shoulders 215 and 216 extending into the peripheral recess 212 inside the casing, a helical spring 217 being located between the rings 213 and 214 for this purpose. In this way, by the rotation of the steering wheel 65 the rod 67 may be forced downwardly or upwardly by the worms 68 and 68a so as to move the pistons 69 and 70 upwardly or downwardly and, thus, deliver manual pressure liquid through to one or the other of the pipes 73, 74 for the operation of the valves 143 and 144 to deliver the pressure liquid to the power cylinders 54 or 55, thus aiding the rotation of the steering wheel 65, as desired.

In the operation of my invention, whenever the vehicle is being operated to steer the same, the steering wheel 65 will be rotated in the direction desired. This will result in the liquid being forced to one or the other of the master cylinder pipes 73, 74 so as to operate one or the other of the valves 143 and 144, thus admitting pressure liquid to one of the inlet valves 167, 168 after closing the corresponding outlet valve 163, 164. This will supply the pressure liquid derived from the gear pump 1, the maximum available pressure of which is determined by the unloading valve 12, and which is maintained at a uniform pressure by the accumulator 26. This delivered pressure liquid will be received in one or the other of the cylinders 54 and 55 so as to move the steering arm 192. The steering of the vehicle in the opposite direction will be accomplished in the same, but reverse, manner by moving the steering wheel in the opposite direction, thus supplying the pressure liquid to the other one of the cylinders 54, 55 while simultaneously releasing the pressure liquid from the other one of said cylinders by the closing of the appropriate inlet valve 167, 168 and the opening of the corresponding outlet valve 163, 164. The discharged liquid will pass out by the pipe 77 to the pipe 79 through the check valve 83, 84, thence to the annular chamber 25 and back to the inlet side 9 of the gear pump 1.

The control of the brakes will take place in a similar manner, and which is operable in a similar way from the same power source, in an advantageous manner, inasmuch as, generally, only one or the other thereof, that is to say the brakes or steering mechanism, is being operated at a given time. In this instance the downward movement of the treadle 104 will move the plunger 102 to supply manual pressure liquid through the pipe 98 to the chamber 185 so as to close the outlet valve 176, 177, followed by the opening of the inlet valve 174, 175 which admits pressure liquid from the pipe 171 to be supplied by the passage 178 to the pressure chamber 179 and by the pipes 107 and 108 to the front and rear wheel brake cylinders 109, 110, 111 and 112. This increase of pressure in the chamber 179 will cause the travel-coordinating piston 96 to move downwardly, thus increasing the volume in the chamber 183 and requiring the treadle 104 to have a travel which is coordinate with the pressure in the pressure chamber 179 which delivers the pressure liquid to the wheel brakes. Any leakages from the travel piston 96 or from the valves 173, 143 and 144 will be carried off by the discharge pipes connected thereto through the inlet side 9 to the gear pump 1. Also, it will be noted that in the retracted positions of the valves 173, 143 and 144 the liquid compensating valves 154, 155 in the lower portions thereof will be opened by contact of the valve stems 149 thereof with the respective valve casings, thus opening the compensating valves to admit or discharge any required equalizing amounts of the liquid in the system.

While I have described my invention above in detail I wish it to be understood that many changes may be made therein without departing from the spirit of the same.

I claim:

1. In a power steering system, the combination comprising, a rotatable steering means, a hydraulic circuit including a master cylinder having a piston, means for reciprocating the piston in accord with the rotation of the steering means, a device to be steered having an element for changing the position thereof, a mechanical connection between said steering means and said element so that turning the steering means steers the device, a fluid motor for moving said element, and a slave steering valve mechanism comprising two independently operable pairs of inlet and outlet valves for actuation respectively by opposite movements of the piston in the master cylinder for admitting and discharging pressure fluid from a source to the said fluid motor for operating said motor in accord with the rotation of the steering means to power steer the device, said source having means for deriving fluid at a substantially constant residual pressure, each pair of inlet and outlet valves having a liquid compensation valve connected to said latter means and said circuit and operable to maintain said circuit filled with fluid obtained from said source.

2. In a power steering system, the combination comprising, a rotatable steering shaft, a master cylinder having a piston, means for reciprocating the piston in accord with the rotation of the steering shaft, a wheel to be steered having an element for changing the wheel axis, a mechanical connection between said steering shaft and said element so that turning the shaft steers the wheel, a fluid motor for moving said element, a slave steering valve mechanism comprising two independently operable pairs of inlet and outlet valves for actuation respectively by opposite movements of the piston in the master cylinder for admitting and discharging pressure fluid from a source to said fluid motor for power steering, a hydraulic circuit including the master cylinder and the slave steering valve mechanism for supplying liquid under manual pressure to actuate the slave steering valve mechanism, the said liquid being obtained from said pressure fluid source, each pair of inlet and outlet valves having a liquid compensation valve.

3. In a power steering system, the combination comprising, a pressure fluid source, a fluid motor for supplying power for steering, a manually rotatable steering shaft for supplying manual effort for steering, a hydraulic circuit including a slave cylinder, a slave cylinder piston in the form of a sleeve valve for admitting and discharging pressure fluid from the source to the fluid motor, and a master cylinder for supplying liquid under manual pressure to actuate the slave cylinder, the said liquid being obtained from the pressure fluid source, and means for compensating the liquid, the said means comprising a valve in the slave cylinder piston having a valve stem to unseat the valve when the slave piston is retracted.

4. In a control system for a vehicle, the combination comprising, hydraulic cylinders for operating the brakes and the steering mechanism of the vehicle, hydraulic means for adjusting the pressure in said cylinders including dual hydraulic circuits connected to the brake and steering cylinders respectively, each said circuit including a low pressure section having means for controlling the pressure in said section manually, and a high pressure section, each said high pressure section including a valve controlling the pressure in the corresponding cylinder, means through which the pressure in the low pressure sections controls the valves to make the pressure in the brake and steering cylinders vary in accordance with the pressure in the respective low pressure section, a pump common to both circuits providing high pressure power fluid and including means for deriving fluid at a substantially constant residual pressure, each said low pressure section including a compensating valve supplied by said last-named means with fluid at said residual pressure, and means for controlling said compensating valves so as to admit fluid to the corresponding low pressure section when the residual pressure in the respective section drops, to maintain the low pressure sections filled with fluid.

5. In a control system for a vehicle, the combination comprising, hydraulic cylinders connected to the brakes and steering mechanism respectively, hydraulic means for adjusting the pressure in said cylinders including dual hydraulic circuits, each said circuit including a manually actuated low pressure section, and a high pressure section, each said high pressure section including a control valve operated by the respective low pressure section for regulating the supply of power fluid to the corresponding hydraulic cylinders, a single source of high pressure power fluid for both said circuits connected to said hydraulic motors via said control valves, means connected to said source for deriving fluid at a substantially constant residual pressure, each said low pressure section including a compensating valve supplied by said last-named means with fluid at said residual pressure and admitting said fluid to the section so as to maintain the section filled.

6. In a control system for a vehicle, the combination comprising, hydraulic cylinders connected to the brakes and steering mechanism respectively, hydraulic means for adjusting the pressure in said cylinders including dual hydraulic circuits, each said circuit including a manually actuated low pressure section, and a high pressure section, each said high pressure section including a control valve operated by the respective low pressure section for regulating the supply of power fluid to the corresponding hydraulic cylinders, a single source of high pressure power fluid for both said circuits connected to said hydraulic cylinders via said control valves, means connected to said source for deriving fluid at a substantially constant residual pressure, and connections from said last-named means including compensating valves for maintaining the low pressure sections filled with fluid at said residual pressure.

7. In a control system for a vehicle, the combination comprising, hydraulic cylinders connected to the brakes and steering mechanism respectively, hydraulic means for adjusting the pressure in said cylinders including dual hydraulic circuits, each said circuit including a manually actuated low pressure section, and a high pressure section, each said high pressure section including a control valve operated by the respective low pressure section for regulating the supply of power fluid to the corresponding hydraulic cylinders, a single source of high pressure power fluid for both said circuits connected to said hydraulic cylinders via said control valves, means connected to said source for deriving fluid at a substantially constant residual pressure, each said low pressure section including a compensating valve supplied by said last-named means with fluid at said residual pressure, and means for controlling said compensating valves so as to admit fluid to the corresponding low pressure section when the residual pressure in that section drops, so that the low pressure sections are maintained filled with fluid.

8. In a power steering system, the combination comprising, a pressure fluid source, a fluid motor for supplying power for steering, a manually operable member for supplying manual effort for steering, a steering valve in the form of a sleeve valve for admitting and discharging pressure fluid from the source to the fluid motor, a hydraulic circuit including a slave cylinder having a piston operating the steering valve and a master cylinder operated by the member for supplying fluid under manual pressure to actuate the slave cylinder, the said hydraulic circuit including a liquid compensating valve in the slave cylinder piston and having a connection to said source for admitting fluid derived from said source to said circuit, the said compensating valve having a valve stem to unseat the valve when the slave cylinder piston is retracted.

9. In a power steering system, the combination comprising, a pressure fluid source, a fluid motor for supplying power for steering, a manually operable steering member for supplying manual effort for steering, a steering valve for regulating the supply of pressure fluid from the source to the fluid motor, a hydraulic circuit including a slave cylinder for operating the steering valve and a master cylinder operated by the steering member for supplying fluid under manual pressure to actuate the slave cylinder, the said hydraulic circuit including a liquid compensating valve having a connection to said source for admitting fluid derived from said source to said circuit, and means for opening said valve to admit such fluid in the retracted postion of the master cylinder.

10. In a hydraulic control system, the combination comprising, a hydraulic circuit including a hydraulic motor, said circuit including a low pressure section including means for adjusting the pressure in said section manually, and a high pressure section, said high pressure section including a control valve operated in accordance with the pressure in the low pressure section for regulating the supply of power fluid to the hydraulic motor, a source of high pressure power fluid connected to said hydraulic motor via said control valve, means connected to said source for deriving fluid at a substantially constant residual pressure, said low pressure section including a compensating valve for admitting fluid to said section from said last-named means, and means for controlling said compensating valve so as to admit fluid to said section when the pressure in the section drops below the said constant residual pressure so as to maintain the section filled with fluid.

11. In a hydraulic control system, the combination comprising, a hydraulic circuit including a hydraulic motor, said circuit including a low pressure section including means for adjusting the pressure in said section manually, said means having a retracted position wherein the pressure in the section is at a minimum and manually variable operating positions for adjusting the pressure in said section above the minimum, and a high pressure section, said high pressure section including a control valve operated in accordance with the pressure in the low pressure section for regulating the supply of power fluid to the hydraulic motor, a source of high pressure power fluid connected to said hydraulic motor via said control valve, means connected to said source for deriving fluid at a substantially constant residual pressure, said low pressure section including a compensating valve for admitting fluid to said section from said last-named means, and means for controlling said compensating valve so as to admit fluid to said section in the retracted position of said means so that the section is maintained filled with fluid.

12. In a hydraulic control system, the combination comprising, a hydraulic circuit including a hydraulic motor, said circuit including a low pressure section including a manually actuated master cylinder for adjusting the pressure in the section, and a high pressure section, said high pressure section including a control valve for regulating the supply of power fluid to the hydraulic motor, a source of high pressure power fluid connected to said hydraulic motor via said control valve, means through which the master cylinder controls said valve for operating the hydraulic motor in accord with the position of the master cylinder, means connected to said source for deriving fluid at a substantially constant residual pressure, said low pressure section including a compensating valve for admitting fluid to said section from said means, and means through which the master cylinder controls said compensating valve so as to admit fluid to said section when the pressure in the section drops below the said constant residual pressure so that the section is maintained filled with fluid, and connections from said last-named means to said compensating valve.

13. In a hydraulic control system, the combination comprising, a hydraulic circuit including a hydraulic motor, said circuit including a low pressure section including a manually actuated master cylinder for adjusting the pressure in the section, and a high pressure section, said high pressure section including a control valve for regulating the supply of power fluid to the hydraulic motor, a source of high pressure power fluid connected to said hydraulic motor via said control valve, means through which the master cylinder controls said valve for operating the hydraulic motor in accord with the position of the master cylinder, means connected to said source for deriving fluid at a substantially constant residual pressure, said low pressure section including a compensating valve for admitting fluid to said section from said means, and means through which said compensating valve is operated so as to admit fluid to said section in the retracted position of the master cylinder and when the pressure in the section drops below the said constant residual pressure so that the section is maintained filled with fluid, and connections from said last-named means to said compensating valve.

14. In a hydraulic control system, the combination comprising, a hydraulic circuit including a hydraulic motor, said circuit including a low pressure section the pressure of which may be varied manually, and a high pressure section, said high pressure section including a control valve operated in accordance with the pressure in the low pressure section for regulating the supply of power fluid to the hydraulic motor, a source of high pressure power fluid connected to said hydraulic motor via said control valve, means connected to said source for deriving fluid at a substantially constant residual pressure, said low pressure section including a compensating valve for admitting fluid to said section from said means when the pressure in the low pressure section drops below the constant residual pressure so as to maintain the section filled with fluid, and connections from said means to said compensating valve.

15. In a power steering system, the combination comprising, a rotatable steering shaft, a hydraulic circuit having a low pressure section including a master cylinder having a master cylinder piston reciprocable therein from a normal neutral position, a hollow worm, said steering shaft being received in said worm, means carried by the shaft for reciprocating the piston from said neutral position in accord with rotation of the steering shaft to produce fluid at low pressure which pressure varies in accordance with the movement of the steering shaft, a device to be steered having a lever associated with said steering shaft for changing the position of said device, a worm gear carried by said lever and meshing with said worm wheel so that turning the shaft steers the device through said lever, said hydraulic circuit having a high pressure section including a fluid motor connected to said lever for providing power assist to steer the device, and a steering valve for regulating the supply of pressure fluid from the source to the said fluid motor, said low pressure section including a slave cylinder operably connected to said steering valve for actuating the latter responsive to variations in low pressure due to movement of the master cylinder piston by said steering shaft, so that said fluid motor operates said lever in response to movement of the steering shaft to provide power assist to steer the device.

16. In a hydraulic control system, the combination comprising, a hydraulic circuit including a hydraulically operated motor, said circuit including a low pressure section including means for adjusting the pressure in said section, and a high pressure section including said motor, a source of high pressure power fluid connected to said motor via said high pressure section and a control valve, means in said high pressure section including said control valve operated in accordance with the pressure in the low pressure section for regulating the supply of power fluid to the motor, means connected to said source for deriving fluid at a substantially constant residual pressure, said low pressure section including a compensating valve for admitting fluid to said low pressure section from said last-named means when the pressure in the low pressure section drops below the constant residual pressure so as to maintain the low pressure section filled with fluid, and an operator associated with said liquid compensation valve responsive to the difference between the residual pressure and the pressure in the low pressure section, and a valve element arranged to be opened by said operator upon a predetermined drop in pressure in said low pressure section below said residual pressure.

17. In a hydraulic control system, the combination comprising, a hydraulic circuit including a plurality of hydraulically operated motors, said circuit including a low pressure section including a plurality of lines each having means for adjusting the pressure therein, and a high pressure section including said motors, a source of high pressure power fluid connected to each of said motors via said high pressure section and a control valve, means in said high pressure section including said control valves operated in accordance with the pressure in the lines respectively of said low pressure section for regulating the supply of power fluid to the respective motors, means connected to said source for deriving fluid at a substantially constant residual pressure, means in said lines respectively of said low pressure section including a compensating valve in association with each of said control valves for admitting fluid to the respective line from said last-named means, and means for selectively operating each of said compensating valves responsive to the difference between the residual pressure and the pressure in the respective low pressure section line so as to maintain the section filled with fluid.

References Cited in the file of this patent

UNITED STATES PATENTS

| | | |
|---|---|---|
| 1,962,857 | Cash | June 12, 1934 |
| 2,252,660 | Kulikoff | Aug. 12, 1941 |
| 2,506,093 | MacDuff | May 2, 1950 |
| 2,517,005 | MacDuff | Aug. 1, 1950 |
| 2,627,187 | Davis | Feb. 3, 1953 |
| 2,637,303 | Cintron | May 5, 1953 |
| 2,675,099 | Troy | Apr. 13, 1954 |

FOREIGN PATENTS

| | | |
|---|---|---|
| 758,143 | France | Oct. 23, 1933 |
| 21,108 | Great Britain | 1907 |
| 527,013 | Great Britain | Oct. 1, 1940 |